United States Patent [19]

Inui et al.

[11] Patent Number: 5,154,902
[45] Date of Patent: Oct. 13, 1992

[54] EXHAUST GAS PURIFYING CATALYST AND EXHAUST GAS PURIFYING PROCESS

[75] Inventors: Tomoyuki Inui, Uji; Hideaki Muraki, Nagoya; Shiroh Kondoh, Aichi; Akio Isogai, Nagoya; Shinichi Matsumoto, Aichi, all of Japan

[73] Assignees: Kabushiki Kaisha Toyota Chuo Kenkyusho, Aichi; Toyota Jidosha Kabushiki Kaisha, Toyoto, both of Japan

[21] Appl. No.: 680,794

[22] Filed: Apr. 3, 1991

Related U.S. Application Data

[63] Continuation-in-part of Ser. No. 411,111, Sep. 22, 1989, abandoned.

[30] Foreign Application Priority Data

Oct. 3, 1988 [JP] Japan .................. 63-249553

[51] Int. Cl.$^5$ .................. B01J 8/00; B01J 8/02; C01B 21/00; C10H 23/00
[52] U.S. Cl. .................. 423/239; 423/213.2; 423/245.1; 423/245.3
[58] Field of Search .................. 423/239, 239 A, 213.2, 423/245.1, 245.3

[56] References Cited

U.S. PATENT DOCUMENTS

| | | |
|---|---|---|
| 4,170,571 | 10/1979 | Ritscher . |
| 4,297,328 | 10/1981 | Ritscher et al. . |
| 4,331,644 | 5/1982 | Ritscher . |

FOREIGN PATENT DOCUMENTS

| | | | |
|---|---|---|---|
| 0003486 | 8/1979 | European Pat. Off. . | |
| 226257 | 6/1987 | European Pat. Off. | 502/77 |
| 288294 | 10/1988 | European Pat. Off. | 502/60 |
| 0311066 | 4/1989 | European Pat. Off. . | |
| 1169206 | 11/1962 | Fed. Rep. of Germany | 423/213.2 |
| 2446006 | 4/1975 | Fed. Rep. of Germany . | |
| 230642 | 12/1984 | Japan | 502/244 |
| 125250 | 7/1985 | Japan | 502/244 |
| 63-119850 | 5/1988 | Japan | 423/213.2 |

*Primary Examiner*—Gregory A. Heller
*Attorney, Agent, or Firm*—Oblon, Spivak, McClelland, Maier & Neustadt

[57] ABSTRACT

An exhaust gas purifying catalyst of this invention is a catalyst for mainly removing nitrogen oxides contained in exhaust gases, comprising: crystalline copper silicate expressed by the following composition formula;

$M_{n+m}(Cu_n Al_m Si_{96-n-m} O_{192}) \cdot 16H_2O$, where M denotes one of sodium (Na) and potassium (K), and $n+m<27$. An exhaust gas purifying process of this invention employs the above-mentioned crystalline copper silicate catalyst. The exhaust gas purifying catalyst and the exhaust gas purifying process employing the same purify the nitrogen oxides (NOx) by facilitating the reaction between hydrocarbons (HC) and nitrogen oxides (NOx) contained in the exhaust gases more preferentially than the reaction between hydrocarbons (HC) and oxygen ($O_2$) contained therein, thereby purifying the nitrogen oxides (NOx) and hydrocarbons (HC) at high efficiency.

7 Claims, No Drawings

EXHAUST GAS PURIFYING CATALYST AND EXHAUST GAS PURIFYING PROCESS

This application is a continuation-in-part of application Ser. No. 07/411,111, filed on Sept. 22, 1989, now abandoned.

BACKGROUND OF THE INVENTION

1. Field of the Invention

This invention relates to a catalyst and a purifying process for purifying nitrogen oxides (NOx) contained in exhaust gases exhausted from internal combustion engines of automobiles and the like, nitric acid production plants, and so forth.

2. Related Art Statement

The nitrogen oxides (NOx) and so on have been contained in the exhaust gases exhausted from internal combustion engines of automobiles and the like, nitric acid production plants, and so forth. There have been many investigations on the purification of the nitrogen oxides contained in the exhaust gases.

So far, reducing catalysts such as noble metals and base metals have been mainly employed to purify the nitrogen oxides contained in a reducing gas. However, few catalysts have been known which purify the nitrogen oxides contained in an oxidizing gas.

According to pages 364 to 365 of the preprints of the sixth catalyst forum in Japan, 1987, there is a report notifying that metallic silicates are useful as catalysts for acid catalyst reaction, ammoxidation, nitrogen monoxide (NO) decomposition and carbon monoxide (CO) oxidation reaction. The metallic silicates are obtained by substituting aluminum of pentasyl type zeolite "ZSM-5" with various metals after synthesizing the zeolite. For example, the report discusses the oxidation reaction catalyzed by the silicate catalyst containing copper, in which propylene is oxidized to acrolein in the oxidation reaction. One of such catalysts is an aluminosilicate (zeolite) with copper loaded by an ion-exchange method. However, the report does not disclose the purification of nitrogen oxides (NOx) and the like contained in the exhaust gases. Though the copper silicate described in the report has an activity as an oxidizing catalyst, it contains less amount of copper and has less durability as an exhaust gas purifying catalyst.

SUMMARY OF THE INVENTION

It is therefore an object of this invention to provide improved copper silicate catalysts having excellent durability to severe environment conditions and promoted ability to purify the nitrogen oxides. This object is attained by examining the composition and the structure of previous copper silicate catalysts It is a further object of this invention to provide a superior purifying process for the exhaust gases.

An exhaust gas purifying catalyst of the present invention is a catalyst for mainly removing the nitrogen oxides contained in the exhaust gases, comprising:

crystalline copper silicate expressed by the following composition formula;

$M_{n+m}(Cu_nAl_mSi_{96-n-m}O_{192}) \cdot 16H_2O$, where M denotes at least one of hydrogen (H), sodium (Na) and potassium (K), and $n+m<27$, said crystalline copper silicate containing copper (Cu) in an amount of at least 2% by weight or more.

An exhaust gas purifying process of the present invention comprises the steps of:

a first step of disposing a crystalline copper silicate catalyst expressed by the above-mentioned composition formula in an exhaust system; and a second step of bringing oxidizing exhaust gases, containing at least hydrocarbons and nitrogen oxides, into contact with the catalyst, thereby removing the nitrogen oxides (NOx).

The exhaust gas purifying catalyst of this invention is a crystalline substance. The exhaust gas purifying catalyst has the above-mentioned composition formula and a structure, in which copper atoms substituting aluminum atoms are fixed in the silicate structure. The exhaust gas purifying catalyst of this invention works best when it is expressed by a composition formula having the "n+m" value of 10. The exhaust gas purifying catalyst thus differs from the known zeolite (aluminosilicate "ZSM-5" produced by Mobile Oil Co., Ltd.) having a structure, in which a part of aluminum atoms are substituted with copper atoms by an ordinary ion-exchange method.

The crystalline copper silicate catalyst expressed by the above-mentioned composition formula can be readily prepared from hydrothermally synthesizing water glass of a predetermined silicate salt, copper ion and so on.

The copper content of the crystalline copper silicate catalyst falls in the range of not less than 2% by weight. When the copper content is less than 2% by weight, it is hard to attain the desirable purifying effects. More preferably, the copper content falls in the range of 3.85 to 6% by weight. When the copper content is less than 3.85% by weight, it is hard to attain the more desirable purifying effects. When the copper content is more than 6% by weight, the purifying effects are not improved in proportion to the increased copper content.

It is a feature of the exhaust gas purifying process of this invention that oxidizing exhaust gases, containing hydrocarbons and nitrogen oxides, are brought into contact with the above-mentioned crystalline copper silicate catalyst to purify the nitrogen oxides (NOx).

Here, the oxidizing exhaust gases mean exhaust gases which contain oxygen ($O_2$) in an excess amount. Namely, the exhaust gases contain oxygen ($O_2$) in an amount more than necessary for completely oxidizing and converting reducing materials, such as carbon monoxide (CO), hydrogen ($H_2$) and hydrocarbons (HC) and the like contained in the exhaust gases, to water ($H_2O$) and carbon dioxide ($CO_2$). For example, in the case of the exhaust gases exhausted from the internal combustion engines of automobiles and the like, the oxidizing exhaust gases mean the exhaust gases with air fuel (A/F) ratios larger than the stoichiometric ratio, or the exhaust gases in fuel lean regions.

The crystalline copper silicate catalyst of this invention purifies the nitrogen oxides (NOx) by facilitating the reaction between hydrocarbons (HC) and nitrogen oxides (NOx) contained in the exhaust gases more preferentially than the reaction between hydrocarbons (HC) and oxygen ($O_2$) contained in the exhaust gases. In this way, the hydrocarbons (HC) and nitrogen oxides (NOx) are purified.

As for the hydrocarbons (HC) included in the exhaust gases, hydrocarbons (HC) remaining in the exhaust gases will do. However, when the amount of the hydrocarbons (HC) is insufficient for reacting the nitrogen oxides (NOx) and hydrocarbons (HC), the hydrocarbons (HC) may be replenished from the external system to compensate the insufficiency. The required amount of hydrocarbons (HC) may preferably fall in the range of 100 to 10000 ppm in terms of methane (CH$_4$).

The exhaust gas purifying process of this invention is generally performed in the following order: the crystalline copper silicate catalyst is first disposed in a reactor; the exhaust gases are introduced into the reactor; the exhaust gases are then brought into contact with the crystalline copper silicate catalyst to reduce and purify the nitrogen oxides (NOx); and finally the purified exhaust gases are exhausted from the reactor.

As for the reaction temperature of the catalyst layer during the purifying, the reaction temperature may preferably fall in the range of 200° to 800° C. in view of the catalyst durability and the catalyst activity. When the reaction temperature is more than 800° C., it is not preferable because the catalyst durability decreases. When the reaction temperature is less than 200° C., it is not preferable because the purifying is performed insufficiently.

In addition, as for the space velocity (SV) of the exhaust gases introduced into the reactor, the space velocity (SV) may preferably fall in the range of 1000 to 100000 hr$^{-1}$ for maintaining the catalyst activity.

The crystalline copper silicate catalyst constituting the exhaust gas purifying catalyst according to this invention has the crystalline silicate structure. In the crystalline silicate structure, part of the aluminum atoms are substituted with the copper atoms, and the copper atoms are fixed in the crystalline silicate structure. The crystalline copper silicate catalyst has a characteristic of nitrogen oxides (NOx) purification superior to the conventional silicate catalysts, in which coppers are loaded by an ordinary ion-exchange method.

When the exhaust gases containing at least hydrocarbons (HC) and nitrogen oxides (NOx) are brought into contact with the crystalline copper silicate catalyst, the nitrogen oxides (NOx) contained in the exhaust gases are reduced and purified to nitrogen (N$_2$) gas at high efficiency.

The crystalline copper silicate catalyst has maintained the exhaust gas purifying performance even after a durability test, in which the crystalline copper silicate catalyst are aged in the air at the temperature of 800° C. for 5 hours. Thus, the crystalline copper silicate catalyst can be applied to an ordinary exhaust gas purifying system for automobiles and the like.

The exhaust gas purifying process according to this invention is the purifying process employing the above-mentioned crystalline copper silicate catalyst, in which the oxidizing exhaust gases containing the hydrocarbons (HC) and nitrogen oxides (NOx) are brought into contact with the crystalline copper silicate catalyst, thereby removing the nitrogen oxides (NOx).

The oxidizing exhaust gases contain an excess amount of oxygen (O$_2$) more than necessary for completely oxidizing and converting the reducing materials, such as carbon monoxide (CO), hydrogen (H$_2$) and hydrocarbons (HC) and the like, to water (H$_2$O) and carbon dioxide (CO$_2$). In the oxidizing exhaust gases, the crystalline copper silicate catalyst facilitates to react the hydrocarbons (HC) with the nitrogen oxides (NOx) more preferentially than to react the hydrocarbons (HC) with the oxygen (O$_2$). Accordingly, the nitrogen oxides (NOx) are first reduced to nitrogen (N$_2$) gas, and then the hydrocarbons (HC) are reacted with the oxygen (O$_2$) and are converted to carbon dioxide (CO$_2$) gas. In this way, the nitrogen oxides (NOx) contained in the oxidizing exhaust gases are purified.

This invention is applicable to the purification of the exhaust gases containing the nitrogen oxides (NOx) exhausted not only from the combustion engines for automobiles and the like, but also from the nitric acid production plants, various combustion facilities, and so on.

DETAILED DESCRIPTION OF THE PREFERRED EMBODIMENTS

Having generally described this invention, a further understanding can be obtained by reference to certain specific preferred embodiments which are provided herein for purposes of illustration only and are not intended to be limiting unless otherwise specified.

FIRST PREFERRED EMBODIMENT

Catalyst Preparation

A crystalline copper silicate catalyst having the Si/Cu atomic ratio of 40 was produced in the following manner.

First, the following three (3) solutions were prepared:

| | |
|---|---|
| Solution "A": | 2.7 grams of copper acetate (Cu(CH$_3$COO)$_2$.H$_2$O); 0.7 grams of aluminum sulfate (Al$_2$(SO$_4$)$_3$.18H$_2$O); 6.2 grams of sulfuric acid (97.5% purity); 7.53 grams of tetrapropylammonium bromide ((C$_3$H$_7$)$_4$NBr); and 60 grams of distilled water |
| Solution "B": | 69.0 grams of water glass (28.93% by weight of SiO$_2$, 9.28% by weight of Na$_2$O and balance being water); and 45.0 grams of distilled water |
| Solution "C": | 130 grams of salt water (20% by weight of salt) |

Then, Solution "C" was poured in a 300 ml beaker, and Solutions "A" and "B" were dropped and mixed with Solution "C" while stirring vigorously and maintaining the pH at 9 to 11 at room temperature After dropping Solutions "A" and "B" completely, the mixed solution was placed in an autoclave, and heated without stirring to the temperature of 160° C. while increasing the temperature at the rate of 1° C./minute. The heating temperature of 160° C. was maintained for 2 hours. Then, the temperature was increased to 190° C. at the rate of 0.33° C./minute, and the heating temperature of 190° C. was maintained for 5 hours. After cooling the mixed solution, product was washed with water until no chlorine ion had been detected. The product was then dried at the temperature of 120° C. for 3 hours. Finally, the product was calcined at the temperature of 540° C. in the air for 3.5 hours. The calcined substance is crystalline copper silicate catalyst which contains copper 3.85% by weight, and the catalyst is expressed by the following composition formula:

$$M_{n+m}(Cu_n)Al_mSi_{96-n-m}O_{192}).16H_2O,$$

wherein m denotes one of sodium (Na) and potassium (K) and n−m<27.

Next, the calcined substance was immersed in 1 mol/liter NH$_4$NO$_3$ solution at 80° C. for 1 hour to convert the calcined substance into ammonium type. After washing the converted substance with water at the room temperature, the converted substance was dried at 100° C. for 24 hours. The converted substance was again calcined in the air at the temperature of 540° C. for 3 5 hours to obtain a crystalline copper silicate catalyst "A". Here, the thus converted ammonium type substance has been further calcined, however, some of its hydrogen atoms remain in the crystalline copper silicate catalyst "A" in a manner similar to sodium (Na) and potassium (K) when the calcination is completed.

The crystalline copper silicate catalyst "A" contains copper by 3.85% by weight, and the catalyst "A" is expressed by the following composition formula;

$M_{n+m}(Cu_nAl_mSi_{96-n-m}O_{192}) \cdot 16H_2O$, where M denotes hydrogen (H), and $n+m<27$.

For a comparison purpose, zeolite type catalyst "B" was prepared out of the "ZSM-5" type zeolite having the Si/Al atomic ratio of 40 in the above-mentioned manner for preparing the crystalline copper silicate catalyst "A". However, 2.7 grams of aluminum sulfate $(Al_2(SO_4)_3 \cdot 18H_2O)$ was used for Solution "A" instead of the copper acetate. Other than this arrangement, the zeolite type catalyst "B" was prepared in the similar manner. The obtained aluminosilicate was made into the zeolite type catalyst "B" by an ordinary ion-exchange method using a aqueous solution of copper acetate. Thus, the aluminum atoms of the aluminosilicate were substituted with copper atoms, and the copper atoms were loaded in the zeolite type catalyst "B". Four (4) grams of copper were loaded in the zeolite type catalyst "B".

Evaluation on Purifying Performance

The purifying performances of the thus obtained crystalline copper silicate catalyst "A" were compared with those of the catalyst "B" of the comparative example, in which copper was loaded in "ZSM-5" type zeolite by an ordinary ion-exchange method.

After a durability test, in which the crystalline copper silicate catalyst "A" and the comparative catalyst "B" were heated and aged in the air at 800° C. for 5 hours, they were brought into contact with a gas simulating an automobile exhaust gas in order to evaluate their purifying performances. The gas had the following composition:

| | |
|---|---|
| Carbon monoxide (CO) | 0.1% |
| Hydrogen (H$_2$) | 330 ppm |
| Nitrogen monoxide (NO) | 670 ppm |
| Total hydrocarbons (THC) | 1180 ppm |
| Carbon dioxide (CO$_2$) | 10% |
| Oxygen (O$_2$) | 4% |
| Water (H$_2$O) | 3% |

The crystalline copper silicate catalyst "A" and the comparative catalyst "B" were brought into contact with the gas under the following conditions:

SV, i.e., space velocity introducing the gas into the catalyst layer: 30000 hr$^{-1}$ Catalyst layer temperature: The catalyst layer was heated from 200° C. to 600° C. at the rate of 5 C./minute.

During the heating of the catalyst layer, conversions exhibited by the crystalline copper silicate catalyst "A" and the comparative catalyst "B" were measured when the catalyst layer temperature was at 300° C. and 400° C. The results are set forth in Table 1.

TABLE 1

| | Conversions (%) | | | | | |
|---|---|---|---|---|---|---|
| | 300° C. | | | 400° C. | | |
| Catalyst | HC | CO | NOx | HC | CO | NOx |
| Catalyst "A" (Pref. Embodi.) | 46 | 3 | 16 | 70 | 5 | 35 |
| Catalyst "B" (Compara. Ex.) | 40 | 0 | 4 | 65 | 0 | 20 |

As set forth in Table 1, the crystalline copper silicate catalyst "A" exhibited the nitrogen oxides (NOx) conversion 4 times as much as the comparative catalyst "B" did at the lower temperature, i.e., 300° C., even after the durability test. The crystalline copper silicate catalyst "A" exhibited the nitrogen oxides (NOx) conversion 1.7 times as much as the comparative catalyst "B" did at the higher temperature, i.e., 400° C., even after the durability test. Further, the crystalline copper silicate catalyst "A" exhibited good hydrocarbons (HC) conversions.

Evaluation on the Purification of Engine Exhaust Gas

A catalyst coated with the crystalline copper silicate catalyst "A" was prepared in the following manner, and mounted on an engine exhaust system. Then, the conversions of carbon monoxide (CO), hydrocarbons (HC) and nitrogen oxides (NOx) exhibited by the catalyst were evaluated.

The above-mentioned crystalline copper silicate catalyst "A" was pulverized, and coated on a monolithic support having the volume of 1.3 liters by using alumina sol as a binder. The amount of the coating was 200 grams. The monolithic support loaded with the crystalline copper silicate catalyst "A" was set in a converter made of stainless steel to prepare catalyst No. 1.

For a comparison purpose, the comparative catalyst "B" was pulverized similarly, and a monolithic support was loaded with the catalyst "B" by using alumina sol to prepare catalyst No. 2.

Each of the two catalysts Nos. 1 and 2 was placed at the distance of 1 meter from the exhaust manifold of an engine in the downstream side thereof. The conversions of the exhaust gas were evaluated to compare the catalyst performances of the catalyst Nos. 1 and 2 under the following engine operation conditions.

Engine Operation Conditions

Total Displacement of Engine (with EFI): 2000 c.c.
Engine Speed: 1600 rpm
Manifold Negative Pressure: 440 mmHg
Air to Fuel Ratio (A/F): 18 (in the fuel lean regions)
The temperature of the exhaust gas was 400° C. at the inlet of the catalyst converter, and the concentration of the nitrogen oxides was 1500 ppm.

After operating the engine under the above-mentioned conditions for about 12 hours, the catalysts Nos. 1 and 2 exhibited the conversions of the exhaust gas components as set forth in Table 2.

TABLE 2

| | Conversions at 400° C. (%) | | |
|---|---|---|---|
| Catalyst No. | HC | CO | NOx |
| Catalyst No. 1 (Pref. Embodi.) | 54 | 3 | 25 |
| Catalyst "B" (Compara. Ex.) | 46 | 0 | 16 |

As set forth in Table 2, the catalyst No. 1 exhibited the nitrogen oxides (NOx) conversion about 1.5 times as much as the catalyst No. 2 did, and also good hydrocarbons (HC) conversions.

SECOND PREFERRED EMBODIMENT

The exhaust gas purifying process of this preferred embodiment employed the above-mentioned crystalline copper silicate catalyst "A", and was evaluated in the same manner as described in the First Preferred Embodiment. The crystalline copper silicate catalyst "A" was first subjected to the durability test, in which the crystalline copper silicate catalyst "A" was heated and aged in the air at the temperature of 800° C. for 5 hours as described in the evaluation on the catalyst performance of the First Preferred Embodiment. Thereafter the crystalline copper silicate catalyst "A" was brought into contact with two types of exhaust gases to compare the nitrogen oxides (NOx) conversion in different exhaust gas environments. One of the two types of exhaust gases was free from hydrocarbons (HC). Other than this, the exhaust gas had an identical composition with that of the exhaust gas used in the evaluation on the purifying performance of the First Preferred Embodiment. The other one was the same exhaust gas used in the evaluation on the purifying performance of the First Preferred Embodiment. The evaluation was performed under the same conditions as described above.

Nitrogen oxides (NOx) conversions exhibited by the crystalline copper silicate catalyst "A" in the different exhaust gas environments were measured when the catalyst layer temperature was at 250° C. and 300° C. The results are set forth in Table 3.

TABLE 3

| | Conversions (%) | | | | | |
|---|---|---|---|---|---|---|
| | 250° C. | | | 350° C. | | |
| HC Existence | HC | CO | NOx | HC | CO | NOx |
| Yes (Pref. Embodi.) | 40 | 2 | 10 | 63 | 3 | 31 |
| No (Compara. Ex.) | — | 2 | 0 | — | 3 | 2 |

As set forth in Table 3, the crystalline copper silicate catalyst "A" exhibited low nitrogen oxides (NOx) conversions in the exhaust gas environment free from hydrocarbons (HC). This means that the oxidizing exhaust gas had reacted the hydrocarbons (HC) with the nitrogen oxides (NOx) and purified the nitrogen oxides (NOx) efficiently on the surface of the crystalline copper silicate catalyst "A".

FIRST MODIFIED PREFERRED EMBODIMENT

The exhaust gas purifying process of this invention may be performed by employing the crystalline copper silicate catalyst and an oxidation catalyst. When such is the case, a reactor comprising the crystalline copper silicate catalyst may be disposed at the upstream side with respect to the exhaust gas flow and a reactor comprising an oxidation catalyst may be disposed at the downstream side with respect to the exhaust gas flow.

In this modified preferred embodiment, the crystalline copper silicate catalyst was disposed at the upstream (front) side with respect to the exhaust gas flow of the actual engine, and the oxidation catalyst was disposed at the downstream (rear) side with respect to the exhaust gas flow thereof. The conversions of carbon monoxide (CO), hydrocarbons (HC) and nitrogen oxides (NOx) exhibited by this arrangement were evaluated in the following manner.

The catalyst No. 1 employed by the above-mentioned First Preferred Embodiment was disposed at the exhaust manifold side, and a commercially available 1.3-liter monolithic oxidation catalyst, in which 2 grams/liter of palladium were loaded, was disposed at the downstream side thereof.

Then, the engine (total displacement: 2000 c.c.) was operated under the following conditions:
Engine Speed: 2000 rpm
Manifold Negative Pressure: 350 mmHg
Air to Fuel Ratio (A/F): 20 (in the fuel lean regions).

Then, the conversions of carbon monoxide (CO), hydrocarbons (HC) and nitrogen oxides (NOx) were measured. The temperature of the exhaust gas was 500° C. at the inlet of the catalyst converter, and the concentrations of the nitrogen oxide (NOx) carbon monoxide (CO) and total hydrocarbons (THC) were 500 ppm, 600 ppm and 1800 ppm, respectively. The conversions of nitrogen oxides (NOx), carbon monoxide (CO) and total hydrocarbons (THC) under the above-mentioned conditions were evaluated to be 52%, 99% and 98%, respectively.

Thus, the exhaust gas purifying process of this first modified preferred embodiment according to this invention could purify nitrogen oxides (NOx), carbon monoxide (CO) and hydrocarbons (HC) efficiently in the oxidizing environment, in which an excess amount of oxygen was present.

SECOND MODIFIED PREFERRED EMBODIMENT

In this second modified preferred embodiment, a monolithic support was employed. An oxidation catalyst was loaded at the rear side of a monolithic support loaded with the crystalline copper silicate catalyst to form an integral monolithic catalyst. The conversions of carbon monoxide (CO), hydrocarbons (HC) and nitrogen oxides (NOx) exhibited by this arrangement were evaluated.

As for the oxidation catalyst, platinum, palladium, rhodium and the like may be specified, and one or more of them may be used. It is preferred to load the oxidation catalyst in an porous support such as alumina, silica, zirconia, zeolite and the like. In this case, the loading amount of the oxidation catalyst may fall in the range of 0.1 to 10 grams with respect to 1 liter of the porous support. When the loading amount is less than 0.1 gram, no desirable effects of oxidation catalyst loading are obtained. When the loading amount is more than 10 grams effects of oxidation catalyst are not improved regardless of the increased loading amount.

A monolithic support made of cordierite of 400-mesh was prepared. The monolithic support was the one produced by Nihon Gaishi Co., Ltd., had the size of 30 mm-diameter and 50 mm-length, and weighed approximately 15 grams. The front half portion (approximately 25 mm) of the monolithic support was coated with a first slurry, and calcined at 500° C. The first slurry was made by mixing 180 parts by weight of the crystalline copper silicate catalyst "A" of the above-mentioned First Preferred Embodiment and 20 parts by weight of alumina sol (AS200) produced by Nissan Kagaku Co., Ltd. The amount of the coating on the monolithic support was approximately 2.5 grams. The rear half portion of the monolithic support was similarly coated with a second slurry. The second slurry was made by mixing 80 parts by weight of gamma-alumina powder (pulverized KH-24) produced by Sumitomo Kagaku Co., Ltd. and 20 parts by weight of the above-mentioned alumina sol. The amount of the coating on the monolithic support was approximately 3 grams. Then, only the rear half portion of the monolithic support, on which the second slurry comprising the gamma-alumina, was immersed in an aqueous solution of nitric acid containing palladium nitrate. The monolithic support was dried at 110° C. for 12 hours, and calcined in the air at 500° C. for 3 hours. The catalyst of the Second Modified Preferred Embodiment was thus prepared.

The conversions of the catalyst of the Second Modified Preferred Embodiment were evaluated at 300° C. and 400° C. under the same conditions as described in the evaluation on the purifying performance of the First Preferred Embodiment, namely under the same gas composition and purifying conditions. The results are set forth in Table 4.

For a comparison purpose, the front half portion and the rear half portion of the catalyst were separated, and the purifying performance of each of them were evaluated, respectively. The results are also set forth in Table 4.

TABLE 4

| Catalyst | Conversions (%) | | | | | |
|---|---|---|---|---|---|---|
| | 300° C. | | | 400° C. | | |
| | HC | CO | NOx | HC | CO | NOx |
| 2nd Modified Pref. Embodi. | 83 | 72 | 34 | 99 | 98 | 75 |
| Catalyst "A" Fr. Half Only | 50 | 0 | 32 | 65 | 3 | 73 |
| Oxida. Cata. Rr. Half Only | 80 | 70 | 0 | 96 | 93 | 0 |

As set forth in Table 4, when the crystalline copper silicate catalyst and the oxidizing catalyst were combined and used, the exhaust gas purifying process of this Second Modified Preferred Embodiment could efficiently purify three (3) components of the exhaust gas, i.e., carbon monoxide (CO), hydrocarbons (HC) and nitrogen oxides (NOx), especially at 400° C.

The crystalline copper silicate catalyst and the oxidizing catalyst of this Second Modified Preferred Embodiment may be used in any shape or structure, for instance, they may be in a granular shape, a pellet shape or a honeycomb shape.

THIRD PREFERRED EMBODIMENT

Catalyst Preparation

A crystalline copper silicate catalyst having the Si/Cu atomic ratio of 9.5 was produced in the following manner.

First, the following three (3) solutions were prepared:

| | |
|---|---|
| Solution "A": | 8.8 grams of copper acetate $(Cu(CH_3COO)_2.H_2O)$; |
| | 0.7 grams of aluminum sulfate $(Al_2(SO_4)_3.18H_2O)$; |
| | 6.2 grams of sulfuric acid; |
| | 7.53 grams of tetrapropylammonium bromide $((C_3H_7)_4NBr)$; and |
| | 60 grams of distilled water |
| Solution "B": | 53.0 grams of water glass; and |
| | 45.0 grams of distilled water |
| Solution "C": | 130 grams of salt water |
| | (20% by weight of salt) |

Then, a crystalline copper silicate catalyst "C" was prepared by using the above-mentioned three (3) solutions in a manner similar to the preparation of the crystalline copper silicate catalyst "A" described in the First Preferred Embodiment section. The crystalline copper silicate catalyst "C" contains copper by 5.8% by weight, and the catalyst "C" is also expressed by the composition formula of the catalyst "A", in which the "n" and "m" are expressed by 9.1 and 0.9, respectively, i.e. n=9.1 and m=0.9.

For a comparison purpose, zeolite type catalyst "D" was prepared out of the "ZSM-5" type zeolite having the Si/Al atomic ratio of 100 in a manner similar to the preparation of the comparative zeolite type catalyst "B" described in the First Preferred Embodiment section. 5.5% by weight of copper was loaded in the zeolite type catalyst "D".

Evaluation on Purifying Performance

The purifying performances of the thus obtained crystalline copper silicate catalyst "C" were compared with those of the catalyst "D" of the comparative example, in which copper was loaded in "ZSM-5"type zeolite by an ordinary ion-exchange method. The evaluation was conducted in a manner similar to the purifying performance evaluation described in the First Preferred Embodiment section. The results are set forth in Table 5.

TABLE 5

| Catalyst | Conversions (%) | | | | | |
|---|---|---|---|---|---|---|
| | 300° C. | | | 400° C. | | |
| | HC | CO | NOx | HC | CO | NOx |
| Catalyst "C" (Pref. Embodi.) | 50 | 4 | 18 | 74 | 6 | 42 |
| Catalyst "D" (Compara. Ex.) | 42 | 0 | 6 | 63 | 0 | 25 |

As set forth in Table 5, the crystalline copper silicate catalyst "C" exhibited the nitrogen oxides (NOx) conversion 3 times as much as the comparative catalyst "D" did at the lower temperature, i.e., 300° C., even after the durability test. The crystalline copper silicate catalyst "C" exhibited the nitrogen oxides (NOx) conversion 1.7 times as much as the comparative catalyst "D" did at the higher temperature, i.e., 400° C., even after the durability test.

Having now fully described the invention, it will be apparent to one of ordinary skill in the art that many changes and modifications can be made thereto without departing from the spirit or scope of the invention as set forth herein.

What is claimed is:

1. An exhaust gas purifying process, comprising the steps of:
   a first step of disposing a catalyst in an exhaust system, said catalyst comprising:
   crystalline copper silicate expressed by the following composition formula;
   $M_{n+m}(Cu_nAl_mSi_{96-n-m}O_{192}).16H_2O$, where M denotes one of sodium (Na) and potassium (K), and N+m<27;
   a second step of bringing oxidizing exhaust gases, containing at least hydrocarbons and nitrogen oxides, into contact with said catalyst, thereby removing said nitrogen oxides;

wherein said second step is performed at the temperature 200° to 800° C.; and said oxidizing exhaust gases are brought into contact with said catalyst at the space velocity of 1,000 to 100,000 hr$^{-1}$ in said second step.

2. An exhaust gas purifying process according to claim 1, wherein said oxidizing exhaust gases contain oxygen in an amount more than necessary for completely oxidizing and converting carbon monoxide, hydrogen and hydrocarbons contained in said exhaust gases to water and carbon dioxide.

3. An exhaust gas purifying process according to claim 1, wherein part of said hydrocarbons is replenished from an external system.

4. An exhaust gas purifying process according to claim 1, wherein the concentration of said hydrocarbons is maintained in the range of 100 to 10000 ppm expressed in a ppm concentration converted into methane.

5. An exhaust gas purifying process according to claim 1, wherein said oxidizing exhaust gases are first brought into contact with said catalyst comprising said crystalline copper silicate, and then brought into contact with an oxidizing catalyst in said second step.

6. An exhaust gas purifying process according to claim 1, wherein in the copper content of said crystalline copper silicate is 2% by weight or more.

7. An exhaust gas purifying process according to claim 1, wherein the copper content of said crystalline copper silicate falls in the range of from 3.85 to 6% by weight.

* * * * *